United States Patent
Lumsden

(10) Patent No.: US 9,044,000 B1
(45) Date of Patent: Jun. 2, 2015

(54) SPIN PROTECTION HERRING HELMET

(76) Inventor: Steven Grant Lumsden, Boring, OR (US)

(*) Notice: Subject to any disclaimer, the term of this patent is extended or adjusted under 35 U.S.C. 154(b) by 175 days.

(21) Appl. No.: 13/567,048

(22) Filed: Aug. 4, 2012

(51) Int. Cl.
*A01K 83/06* (2006.01)

(52) U.S. Cl.
CPC ........................... *A01K 83/06* (2013.01)

(58) Field of Classification Search
CPC .......................................................... A01K 83/06
USPC ........ 43/44.2, 44.4, 44.6, 42.22, 42.23, 42.36
See application file for complete search history.

(56) References Cited

U.S. PATENT DOCUMENTS

| | | | | |
|---|---|---|---|---|
| 2,518,593 | A * | 8/1950 | Bell | 43/44.2 |
| 2,582,646 | A * | 1/1952 | Moore | 43/44.2 |
| 2,736,124 | A * | 2/1956 | Wittmann, Jr. | 43/42.23 |
| 2,763,086 | A * | 9/1956 | Johnson et al. | 43/44.2 |
| 3,205,608 | A * | 9/1965 | Dickinson | 43/42.23 |
| 3,230,658 | A * | 1/1966 | Wuotila | 43/42.23 |
| 3,248,820 | A * | 5/1966 | Lamar | 43/42.23 |
| 3,388,495 | A * | 6/1968 | Minser | 43/42.23 |
| 3,645,031 | A * | 2/1972 | Egles | 43/44.2 |
| 3,685,191 | A * | 8/1972 | Metzger | 43/42.23 |
| 3,879,881 | A * | 4/1975 | Vick | 43/42.23 |
| 3,893,255 | A * | 7/1975 | Hicks | 43/44.4 |
| 3,950,882 | A * | 4/1976 | Monchil | 43/42.23 |
| 4,133,132 | A * | 1/1979 | Ellis et al. | 43/44.4 |
| 4,134,224 | A * | 1/1979 | Clark | 43/42.36 |
| 4,589,222 | A * | 5/1986 | Barnhart | 43/42.23 |
| 4,848,023 | A * | 7/1989 | Ryder et al. | 43/44.4 |
| 4,869,014 | A * | 9/1989 | Francklyn | 43/44.6 |
| 4,932,154 | A * | 6/1990 | Andreetti | 43/44.6 |
| 5,177,895 | A * | 1/1993 | Baron | 43/44.2 |
| 5,329,720 | A * | 7/1994 | Baron | 43/44.2 |
| 5,377,442 | A * | 1/1995 | Gariglio | 43/44.4 |
| 5,603,182 | A * | 2/1997 | Wilson | 43/44.2 |
| 5,778,593 | A * | 7/1998 | Baron | 43/44.4 |
| 5,862,623 | A * | 1/1999 | MacPherson | 43/42.36 |
| 5,887,378 | A * | 3/1999 | Rhoten | 43/42.23 |
| 5,893,232 | A * | 4/1999 | Horton et al. | 43/44.4 |
| 6,061,948 | A * | 5/2000 | Boucek | 43/42.36 |
| 6,230,433 | B1 * | 5/2001 | Nichols | 43/44.2 |
| 6,516,552 | B2 * | 2/2003 | Hawkins | 43/44.2 |
| 6,675,526 | B1 * | 1/2004 | Baron | 43/42.36 |

(Continued)

FOREIGN PATENT DOCUMENTS

| | | | | |
|---|---|---|---|---|
| DE | 102008018293 | * | 10/2009 | A01K 83/06 |
| EP | 1813149 A1 | * | 8/2007 | A01K 83/06 |

(Continued)

*Primary Examiner* — Darren W Ark
(74) *Attorney, Agent, or Firm* — Applied Logic Patents; Andrew B. Levy

(57) ABSTRACT

A spinning device for covering and maintaining the front face of a bait fish resulting in greater utility, ease of use and bait durability. The device comprises a cup having a planar face and cylindrical wall adapted to extend rearward along the sides of the bait fish when the inside surface mates a "plug-cut" bait fish frontal face. The device has compound angled surfaces, a planar surface between multiple apertures enabling secure spin options and stability due to deep cup depth seating as well as enlarged flange apertures capable of accepting a standard toothpick. A trio of spaced apart apertures are formed in the device's frontal face allowing for a fishing leader terminating in one or more hooks extending through the device into the bait fish's body. The rotational spin rate of the device is determined by which of the three apertures the leader passes.

6 Claims, 3 Drawing Sheets

(56) References Cited

U.S. PATENT DOCUMENTS

| | | |
|---|---|---|
| 6,698,133 B1 * | 3/2004 | Fricke .................. 43/44.2 |
| 7,174,669 B1 * | 2/2007 | Kallas .................. 43/42.23 |
| 7,216,456 B2 * | 5/2007 | Kaariainen et al. ...... 43/42.23 |
| 7,263,798 B2 * | 9/2007 | Nichols ................ 43/42.09 |
| 8,474,174 B2 * | 7/2013 | Norman ................ 43/42.23 |
| 2009/0100737 A1 * | 4/2009 | Hunter ................. 43/44.4 |

FOREIGN PATENT DOCUMENTS

| | | | | |
|---|---|---|---|---|
| EP | 1867229 A1 | * | 12/2007 | ............ A01K 83/06 |
| FR | 2858178 A1 | * | 2/2005 | ............ A01K 83/06 |
| FR | 2858179 A1 | * | 2/2005 | ............ A01K 83/06 |
| FR | 2895642 A1 | * | 7/2007 | ............ A01K 83/06 |
| GB | 2299739 A | * | 10/1996 | ............ A01K 83/06 |
| JP | 2007000084 A | * | 1/2007 | ............ A01K 83/06 |

* cited by examiner

SPIN PROTECTION HERRING HELMET

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

This invention relates to fishing bait and more particularly to a device for spinning and protecting the front face of a "plug-cut" bait fish.

2. Prior Art

A common and highly effective fishing bait is formed by severing the head of a bait fish at a pre-determined angle and then threading the resulting "plug" with a leader line terminating in a single hook or pair of hooks embedded in the body of the "plug". The head is severed so that the front face of the "plug" lies along a plane which intersects the longitudinal axis of the bait fish at a 45 degree angle when viewed from both top and lateral locations. This particular angle of cut causes the "plug" to resemble the motion of a wounded fish as the "plug" is towed through water or in a moving current. A particular problem with the use of "plug-cut" bait fish is that the front face of the "plug" quickly becomes deformed and begins to separate. Initially the only problem encountered with this deformation is that the "plug" no longer resembles the actual motion of a wounded fish with any degree of accuracy. Subsequently, however, as the "plug" begins to separate and disintegrate the "plug" tends to become easily detached from the leader line. Consequently, a "plug-cut" bait fish simulates a live wounded fish for only a limited period of time as the "plug" is easily deformed or detached from the leader line. Although bait protector devices which cover or enclose the forward portion of bait are in conventional use, these devices are not provided for the purpose of maintaining a pre-determined shape of the bait but rather to either support a hook within the bait or to maintain the gills and mouth of a whole fish closed in order to prevent bait deformation.

The present invention is different from other inventions in the following ways. In Francklyn U.S. Pat. No. 4,869,014, an adjustable bait receiving fishing lure for use in receiving baits of varying size produce differeing lure receiving patterns via a diving lip to control depth retrieval and swimming action. In Andretti U.S. Pat. No. 4,932,154, a trolling rig was disclosed as a method of combining Ballyhoo intended bait where a conical cap resembles a Ballyhoo's head. In Baron, U.S. Pat. Nos. 5,177,895, 5,329,720 and 5,779,593, a fishing lure is disclosed for attaching a bait to a fishing line comprising a lure head having a front aperture for an extended through line where the line is restrained from movement relative to the lure insert where a locking pin extends through the bait to the restraining mount. In Garigio, U.S. Pat. No. 5,377,442, a leader wire and hook allow for two methods of operation, where both methods depress a trigger into the housing to maintain the bait in a locked and secure position. In MacPherson, U.S. Pat. No. 5,862,623, a device having two mating layers of velcro for resembling the body of a fish allow that body to be manipulated or impregnated with attractant odors. In Hawkins, U.S. Pat. No. 6,516,552, a device with two angled thin faces, flat or curved with a horizontal insert is secured in the mouth of an artificial bait fish. In Baron, U.S. Pat. No. 6,675,525, an artificial bait fish longitudinally extends a fish body member formed as a fish replica with a body bore from head to tail for receiving a fishing line for positioning the fishing hook relative to the tail portion.

In Fricke, U.S. Pat. No. 6,698,133, a device with a pin rig includes at least one pin inter-connected to a pin support. It has a free end, a fastener and a rigging tool for securing the fastener and attachment mechanism. The mechanism includes inserting a hook attached to a leader into the bait, attaching a pin support to a portion of the leader, piercing a portion of the bait and securing a fastener to the free end of the pin. In Fricke, U.S. Pat. No. 7,263,798, a removable head for a fishing lure for changing the action of the lure to one of the following: a soft body lure, diving lure, rising lure, chugger or popper. The removable head may slide onto the lure and include a front face for creating action. In Boucek, U.S. Pat. No. 6,061,948, an interchangeable device head member is adapted to be coupled onto an existing fishing lure (worm or fly) directed to a hollow receiving chamber with attaching components bent inward where they engage eyelets for a fishing line lure hook.

Objects and Advantages

The current invention enables the angler to achieve the following benefits related to bait fish practice: perfect bait fish spin control, rigging with standard bait fish hook configurations including treble hooks, capable of fishing with dodgers or flashers; multiply sized configurations and colors for attracting fish at various depths and water conditions; extends the life of cut bait both fresh and soft varieties; able to be used with standard sized toothpicks; maintains a perfect cut angle; ease of use setup; capable of use with any trolling setup including exceptional inter-operation with LongLiner®; multiple methods of rigging leaders and provides durable construction for year after year usage.

Disadvantages of the Prior Art

The Plug Cut Herring Protector, U.S. Pat. No. 4,133,132 has some limitations in its operation. The present invention incorporates a feature so that spin is produced on the cut bait fish when trolling or in moving water currents. The operation of the present invention incorporates correctly sized apertures preventing the Sure Spin device from sliding along the leader line below the eye of the hook which has been a problem with the invention disclosed in U.S. Pat. No. 4,133,132. The leading edge surface in the present invention does not include an inter-connected channel between aperatures as it proved to be detrimental in the invention disclosed in U.S. Pat. No. 4,133,132 where the leader line would work through the channel during normal use being a detriment to bait action. The present invention has a deeper cup to accept a pre-cut bait fish producing greater stability when compared to the same disclosure. On each side of the cup, right and left lateral sides are two flanges that have an aperture of the proper diameter to accept a common round toothpick. The prior art device has apertures capable of accepting a weaker flat toothpick resulting in a less secure attachment.

SUMMARY

It is an object of the present invention to provide a planar face for a plug-cut bait fish which intersects the horizontal and vertical planes of the plug-cut bait fish at a precisely selected angle. It is another object of the invention to preserve the planar nature of the front face so that the front face does not rapidly become distorted on use. It is still another object of the present to reduce the rate at which a plug-cut bait fish deteriorates during use by increasing the time window during which the plug-cut bait fish is securely fastened to a fishing line leader maintaining proper mating and proper spin action. A further object of the present is to improve the utility and ease of use promoting greater bait durability where compound angled surface aperture location adjustments, surface aperture diameter adjustments and increased depths for securely seating cut bait fish as well as enlargement of the lateral wall flange apertures to accept standard round toothpicks. These and other objectives of the present invention are accomplished by a sure spin device for covering the front face of plug-cut bait fish. The sure spin device has a planar face cover member having a shape corresponding to the shape of the front face of a plug-cut bait fish when viewed from either side. The cover member is surrounded by a sidewall which extends rearward along the outside of a plug-cut bait fish parallel to its longitudinal axis when the cover member inside face firmly contacts the front face of the plug-cut bait fish. The face of the cover has a trio of apertures formed therein on the right hand side of the vertical center line. The spinning action of the plug-cut bait fish as it is towed through water or currents may be adjusted by selection of one of the multiple apertures the leader line passes through before extending and terminating in at least one hook embedded in the plug-cut bait fish. The cover member is fastened to the plug-cut bait fish through the pair of apertures located on the lateral sidewalls on opposite sides of the cover member.

DRAWINGS

Reference Numerals

Figure 1:
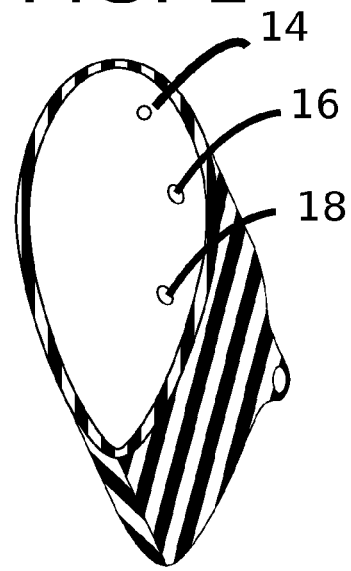
FIG. 1 is a side elevational view of the sure spin device installed on a plug-cut bait fish.
Figure 2:
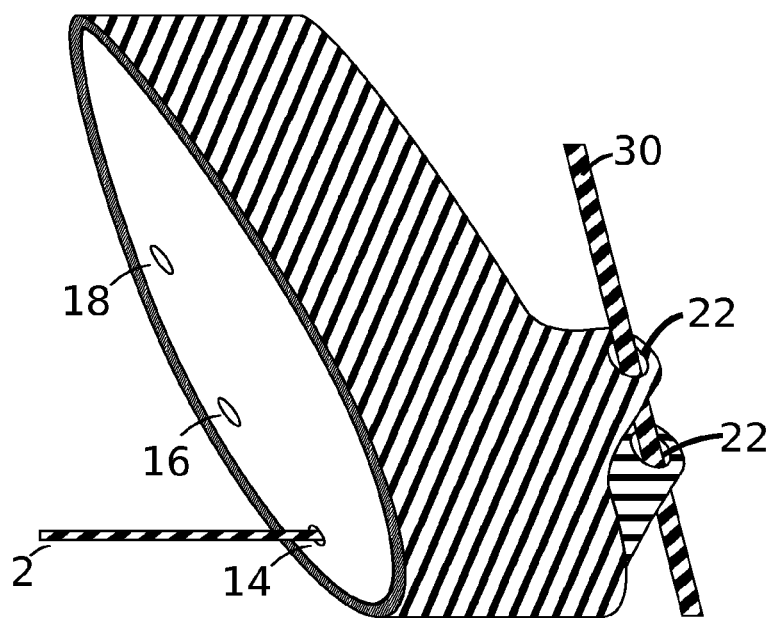
FIG. 2 is a front elevational view of the sure spin device.
Figure 3:
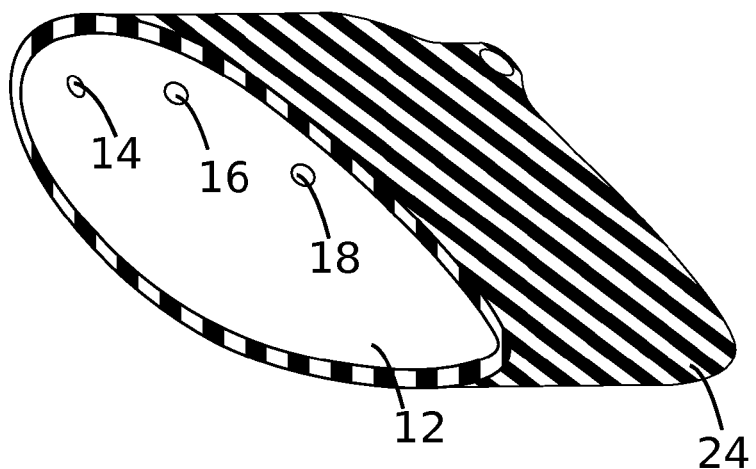
FIG. 3 is an isometric view of the sure spin device.
Figure 4:
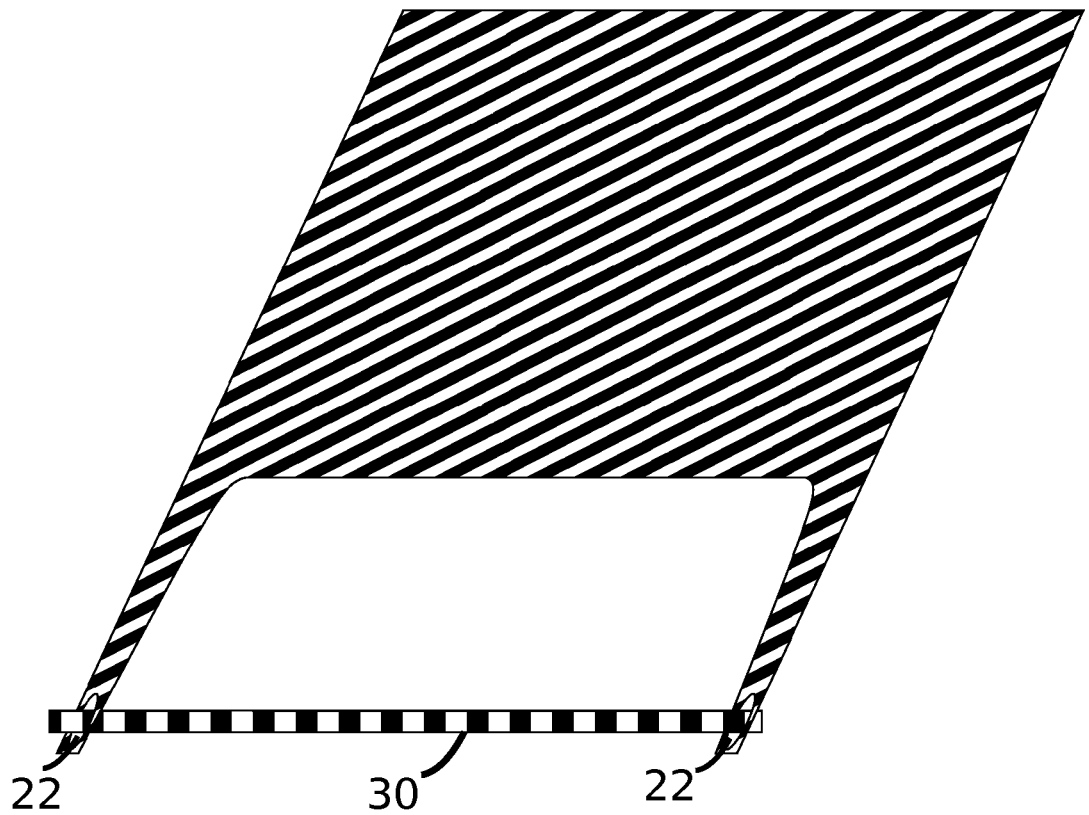
FIG. 4 is a side elevational view of the sure spin device.
Figure 5:
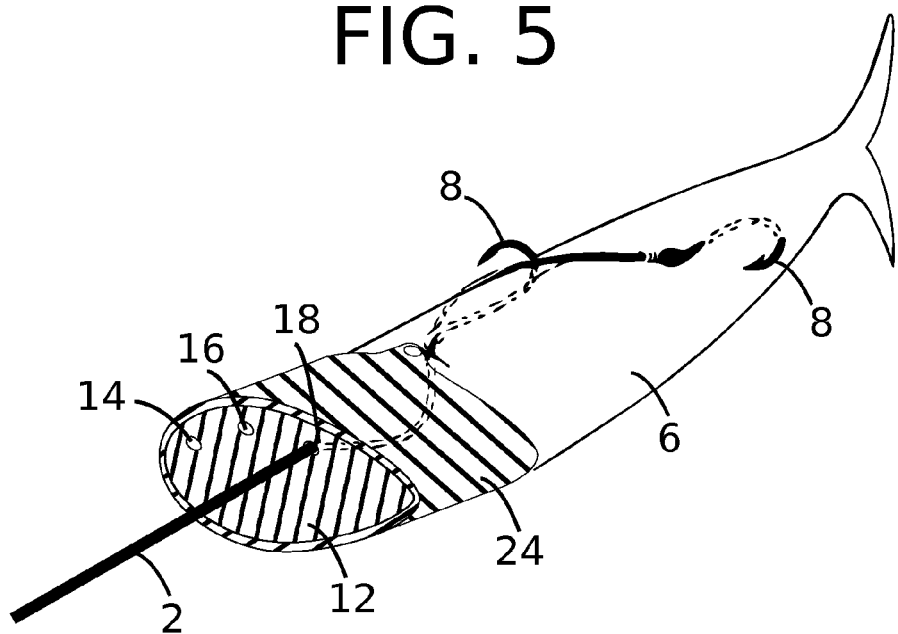
FIG. 5 is a side cross sectional view of the sure spin device.

Description
2 Leader line
6 Bait fish body
8 Hook
12 Front face member
14 +60° angle aperture
16 +30° angle aperture
18 −30° angle aperture
22 Lateral aperture
24 Lateral cup member
30 Round toothpick

DETAILED DESCRIPTION OF DRAWINGS

A sure spin bait fish is prepared by severing the bait fish head at an angle of 45 degrees with respect to both horizontal and vertical planes. In normal usage a leader line terminating on one or more hooks 8 is threaded through the sure spin bait fish body 6 in a manner illustrated in FIG. 1. When the sure spin bait fish is towed through water or currents, the leader line 2 fed through one of the following; +60° angle aperture 14, +30° angle aperture 16 or −30° angle aperture 18 produces a spin rotation serving as a catch attractant.

The sure spin bait fish device of the present invention as illustrated in the drawings provided is adapted to cover the front face of the bait fish body to prevent deterioration of the bait fish body 6 which would alter the shape of its front face ruining bait action and allow the hook to be more easily separated from the sure spin bait fish. The device includes a front face member 12 having a shape corresponding to the shape of the front face of the plug-cut bait fish when viewed from a lateral side view. A lateral cup member 24 extends around the front face member 12 so that the lateral side cup member 14 may extend along the perimeter of the sure spin bait fish parallel to the axis of the sure spin bait fish while the interior face of the front face member 12 firmly mating with the bait fish body 6.

The lateral cup member 24 intersects the front face member 12 at a 45° angle in both horizontal and vertical planes. The sure spin bait fish device is manufactured in a variety of sizes to allow for coupling with a wide range of plug-cut bait fish body 6 sizes. The front face member 12 is secured to the plug-cut bait fish body 6 by inserting a round tooth pick 30 through a pair of lateral apertures 22 extending rearward from each lateral cup member 24 on opposite sides thereof so that a round toothpick 30 or like pin may pierce the flesh of a bait fish body 6.

The front face member 12 contains a trio of apertures; +60° angle aperture 14, +30° angle aperture 16 and −30° angle aperture 18 adapted to allow a leader line 2 to pass rearward through front face member 12 and into the flesh of the plug-cut bait fish body 6. Passing the leader line 2 through the afore-mentioned aperatures 14, 16 and 18 allows adjustment of the spin behavior as the plug-cut bait fish body 6 is towed through a body of water. The spin action selected will, of course, depend upon which is most effective for the given species of fish used as bait and on the desired catch.

The front face member 12 intersects both vertical and horizontal planes of the plug-cut bait fish 6 at an optimal angle of 45° regardless of how long the bait fish is able to be used. The walls of the front face member 12 and the lateral cup member 24 compress the forward end of the bait fish body 6 preventing the flesh of the plug-cut bait fish body 6 from deforming with use so that leader line 2 is securely fastened to the plug-cut bait fish body 6 for an extended period of time.

CONCLUSIONS, RAMIFICATION AND SCOPE

The spin device is a highly useful, novel and functional bait fish device. It is capable of being fabricated in a variety of size and color configurations via a wide range of techniques. The device also permits use of a plug-cut bait fish without the need for eviscerating the bait fish. Such usage adds additional value as intact viscera leaving a trailing scent is considered attractive to the fish catch for which the angling is conducted.

I claim:
1. A spin protection device for covering an angular cut front face of a plug-cut bait fish, comprising a planar cover member whose shape provides a front face for said plug-cut bait fish, said cover member surrounded by a lateral wall intersecting said cover member at first and second sides of said cover member at a slight angle such that an inside face of said cover member is adapted for internal flush contact with the angular cut front face of said plug-cut bait fish, wherein in use said lateral wall extends rearward a distance along an outside of said plug-cut bait fish parallel to a longitudinal axis of said plug-cut bait fish, said cover member having at least one aperture formed therein adapted to allow a fishing leader and at least one hook to freely pass rearward through said cover member into said plug-cut bait fish, a toothpick style securing means for fastening said cover member to said plug cut bait fish such that the cut front face of said bait fish facilitates dispersal of scent from a retained viscera of said bait fish and said spin protection device, while occupying a relatively small portion of the bait fish, prevents deterioration of said angular cut front face of said bait fish while allowing said fishing leader and at least one hook to pass directly and freely into said bait fish, wherein said at least one aperture formed in said planar cover member further comprises a trio of spaced apart apertures formed through a planar surface of said planar cover member such that the spinning action of said plug-cut bait fish when towed through water may be altered by selection of one of said trio of spaced apart apertures, said trio of spaced apart angles corresponding to angles of +60, +30 and −30 degrees respectively, wherein in use said fishing leader and at least one hook pass through one of said trio of spaced apart apertures, said planar surface having a longitudinal axis which extends in a vertical direction with respect to a horizontally extending longitudinal axis of said spin protection device, said trio of spaced apart apertures both oriented in and spaced apart from each other along the vertical direction on said planar surface of said planar cover member, and said trio of spaced apart apertures being both located on one side of said longitudinal axis of said planar surface and laterally offset from each other in a direction which is transverse to the longitudinal axis of the planar surface.

2. The device of claim 1 wherein said toothpick style securing means comprises flange apertures formed through the lateral wall, said flange apertures being adapted to accept standard round toothpicks of approximately 0.0625" in diameter.

3. The device of claim 1 wherein a depth of the spin protection device has been adapted to securely seat a plug-cut bait fish.

4. The device of claim 1, wherein said securing means comprises a pair of apertures located in said lateral wall on opposite sides thereof and a retaining means comprising a toothpick or other object adapted for insertion through said pair of apertures and flesh of said plug-cut bait fish.

5. The device of claim 1 wherein a color of the device is any possible hue or shade which may be appropriate for water conditions.

6. The device of claim 1 wherein the device may be scaled to any reasonable size to accommodate plug-cut bait fish of various species.

* * * * *